United States Patent [19]
Tsai et al.

[11] Patent Number: 5,825,815
[45] Date of Patent: Oct. 20, 1998

[54] DUAL UART DEVICE WITH A REDUCED PACKAGE PIN NUMBER

[75] Inventors: Hsi-jung Tsai, Hsinchu Hsien; Sheng-hung Wang, Taipei Hsien, both of Taiwan

[73] Assignee: Winbond Electronics Corp., Hsinchu, Taiwan

[21] Appl. No.: 712,442

[22] Filed: Sep. 11, 1996

[51] Int. Cl.$^6$ .............................. H04B 1/38; H04L 5/16
[52] U.S. Cl. ........................................... 375/220; 375/239
[58] Field of Search ................................. 375/220, 222, 375/239; 370/366

[56] References Cited

U.S. PATENT DOCUMENTS

| | | | |
|---|---|---|---|
| 4,384,307 | 5/1983 | Kuzmik et al. | 358/257 |
| 4,903,280 | 2/1990 | Lang et al. | 375/7 |
| 4,995,058 | 2/1991 | Byers et al. | 375/23 |
| 5,113,278 | 5/1992 | Degura et al. | 359/154 |
| 5,267,263 | 11/1993 | Feezel et al. | 375/7 |
| 5,411,536 | 5/1995 | Armstrong | 607/32 |
| 5,446,757 | 8/1995 | Chang | 375/239 |
| 5,475,381 | 12/1995 | Williamson et al. | 340/825.57 |
| 5,623,480 | 4/1997 | Hartmann et al. | 370/241 |
| 5,640,433 | 6/1997 | Szczebak, Jr. et al. | 375/377 |
| 5,703,871 | 12/1997 | Pope et al. | 370/248 |

*Primary Examiner*—Stephen Chin
*Assistant Examiner*—Mohammad Ghayour
*Attorney, Agent, or Firm*—Hedman, Gibson & Costigan, P.C.

[57] ABSTRACT

A circuit arrangement between an input/output (I/O) integrated circuit (IC) and an I/O coupler IC includes a first universal asynchronous receiver-transmitter (UART) and a second UART provided within the I/O IC, each of the UART having a plurality of output serial terminals and input serial terminals, a first pulse position modulation (PPM) circuit connected to the parallel output terminals of the first UART and the second UART and having an output pin, a first pulse position demodulation (PPDM) circuit connected to the parallel input terminals of the first UART and the second UART and having two input pins, a second PPDM circuit provided within the I/O coupler IC and connected to the output pin of the first PPM circuit with two sets of output terminals, a second PPM circuit provided within the I/O coupler IC and connected to the input pins of the first PPDM circuit with two sets of input terminals, two voltage converters each respectively connected with a set of input terminals of the second PPM circuit and a set of output terminals of the second PPDM circuit and having a set of input parallel pins and a set of output parallel pins, a control circuit/clock generator provided within the I/O IC and having two output pins, and a control circuit provided within the I/O coupler IC and having two input pins connected to the output pins of the control circuit/clock generator.

8 Claims, 3 Drawing Sheets

DUAL UART DEVICE WITH A REDUCED PACKAGE PIN NUMBER

BACKGROUND OF THE INVENTION

The present invention relates to an integrated circuit, and particularly to a dual UART integrated circuit with a reduced package pin number.

At present, VLSI (Very Large Scale Integration) technology is advancing at a rapid pace, and this results in a higher integration of devices per chip in VLSI. Consequently, a higher package pin number is required. Thus, a higher manufacturing cost for such integrated circuits (ICs) will be incurred.

When an IC designer proceeds with an integration evaluation in view of cost, he will always consider a lower package pin number rather than a higher integration of device number. The IC package number has been standardized for different package types, such as a QFP (Quad Flatpack) type, types having a 100-pin package and a 160-pin package are two of the most popular packages in view of the cost consideration. In the case of an IC design which requires 101 or 102 terminals, only the 160-pin package can be applied to this IC design. Therefore, the increasing of cost for packaging as well as the occupied area of the related printed circuit board is inevitable. Alternatively, an IC designer may reduce the integrated function in compliance with the 100-pin package, however, such a solution will impair the overall performance of the IC as well as its competitiveness.

SUMMARY OF THE INVENTION

An object of the present invention is to provide a dual UART IC with a reduced package pin number.

Another object of the present invention is to provide a novel structure for reducing the package pin number for a dual UART IC.

According to the present invention, a circuit arrangement between an input/output (I/O) integrated circuit (IC) and an I/O coupler IC includes a first universal asynchronous receiver-transmitter (UART) and a second UART provided within the I/O integrated circuit, each of the UART having a plurality of output serial terminals and input serial terminals, a first pulse position modulation (PPM) circuit connected to the parallel output terminals of the first UART and the second UART, and having an output pin, a first pulse position demodulation (PPDM) circuit connected to the parallel input terminals of the first UART and the second UART and having two input pins, a second PPDM circuit provided within the I/O coupler IC and connected to the output pin of the first PPM circuit with two sets of output terminals, a second PPM circuit provided within the I/O coupler IC and connected to the input pins of the first PPDM circuit with two sets of input terminals, two voltage converters each respectively connected with a set of input terminals of the second PPM circuit and a set of output terminals of the second PPDM circuit and having a set of input parallel pins and a set of output parallel pins, a control circuit/clock generator provided within the I/O IC and having two output pins, and a control circuit provided within the I/O coupler IC and having two input pins connected to the output pins of the control circuit/clock generator for synchronizing the signals between the I/O IC and the I/O coupler IC.

Other objects, advantages, and novel features of the invention will become more apparent from the following detailed description when taken in conjunction with the accompanying drawings.

DETAILED DESCRIPTION OF THE PREFERRED EMBODIMENTS

Referring now to the several drawing figures in which identical elements are numbered identically throughout, a description of the preferred embodiment of the present invention will now be provided.

Figure 1:
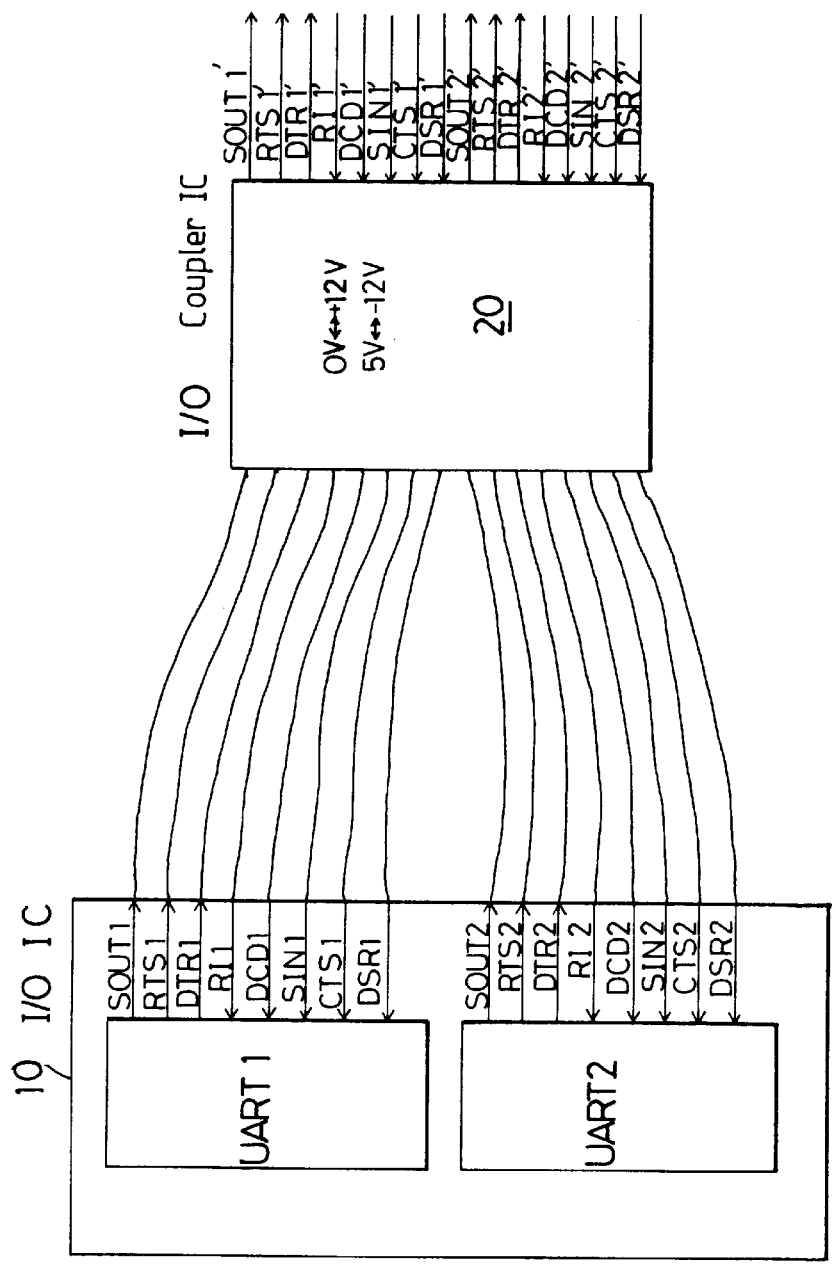
FIG. 1 is a simplified block diagram of a conventional I/O integrated circuit and a conventional I/O coupler integrated circuit.

Referring to FIG. 1, an I/O integrated circuit (IC) 10 and an I/O coupler IC are connected to each other. The I/O IC 10 includes two Universal Asynchronous Receiver-transmitters (UARTs) UART1, UART2 each including five input pins SIN (Serial Input), CTS (Clear To Send), DSR (Data Set Ready), DCR (Data Carrier Detect), and RI (Ring Indicator) for receiving a plurality of input signals from the I/O coupler IC and three output pins SOUT (Serial Output), RTS (Request To Send), and DTR (Data Terminal Ready). A total pin number of the I/O IC 10 will be 16 which will be connected to external appliance via the I/O coupler IC. The I/O coupler IC is substantially a voltage converter 20 for converting a voltage signal from the I/O IC 10 of 0 volt to 12 volts or 5 volts to −12 volts. Thus, both of the I/O IC 10 and the I/O coupler 20 require 16 pins for the interconnection therebetween. Thus, a high package pin number is required for the I/O IC 10 and the I/O coupler IC.

Figure 2:
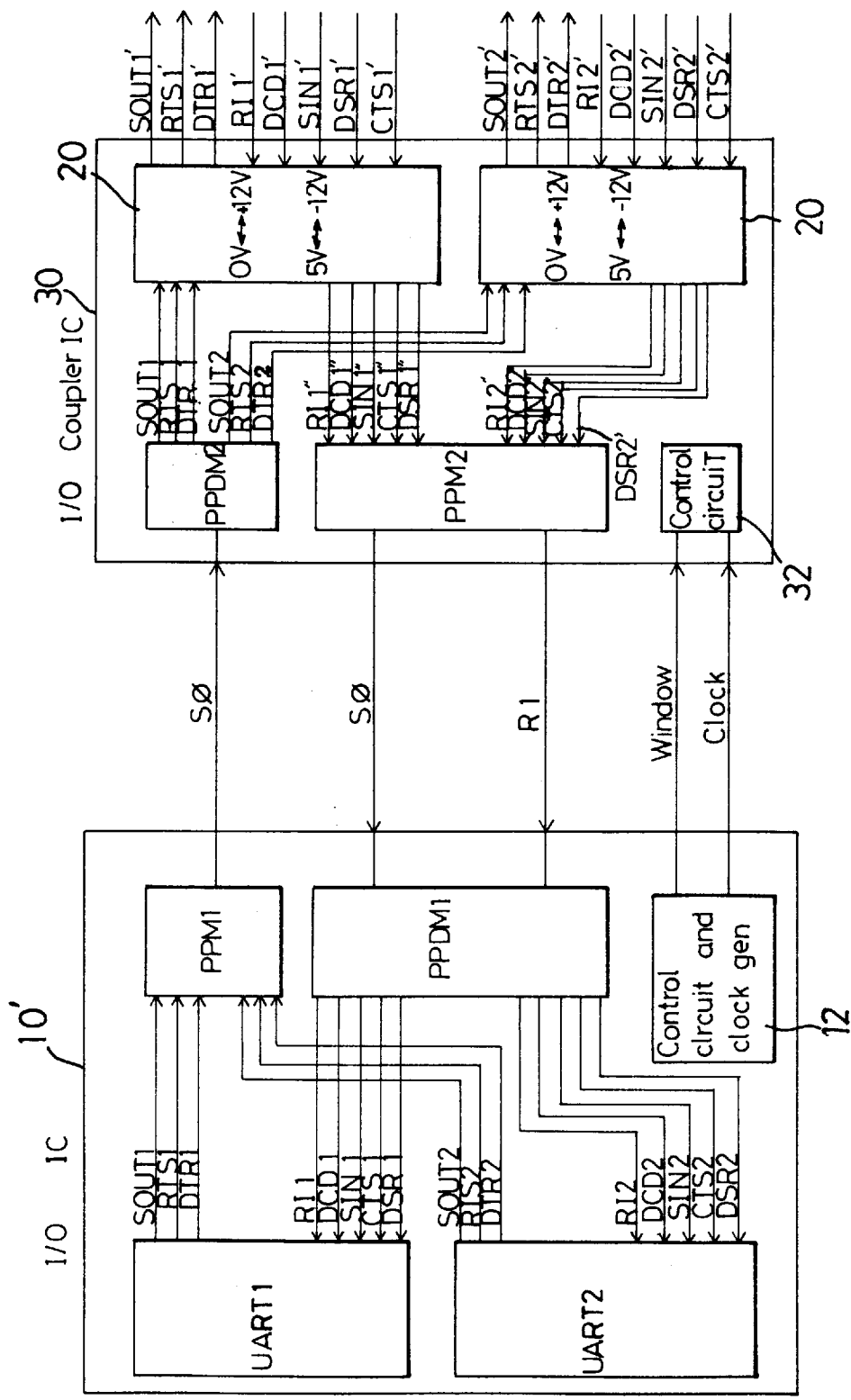
FIG. 2 is a block diagram of an I/O integrated circuit and an I/O coupler integrated circuit according to the present invention.

Referring to FIG. 2, an I/O IC 10' according to the present invention further comprises a pulse position modulation PPM1 for connecting all of the three output pins SOUT1, RTS1, DTR1, SOUT2, RTS2, and DTR2 of the UART1 and UART2, a pulse position demodulation PPDM1 for connecting to all of the input pins RI1, DCD1, SIN1, CTS1, DSR1, RI2, DCD2, SIN2, CTS2, DSR2 of the UART1 and UART2, a control circuit and a clock generator 12 for outputting a window signal and a clock signal.

An I/O coupler IC 30 according to the present invention further comprises a pulse position demodulation PPDM2 for receiving a signal S0 from the PPM1 and outputting two sets of signals through terminals SOUT1, RTS1, and DTR1; SOUT2, RTS2, and DTR2. Two voltage converters 20 are further provided within the I/O coupled IC 30 for respectively receiving a corresponding set of signals from the pulse position demodulation PPDM2 and converting the received signal to a voltage amplitude as mentioned. Each of the voltage converters 20 further receive two sets of input signals from the external apparatus and outputting two sets of converted signals RI1", DCD1", SIN1", CTS1", and DSR1"; RI2", DCD2", SIN2", CTS2", and DSR2". A pulse position modulation PPM2 is provided within the I/O coupler IC 30 for receiving two sets of the converted signals RI1', DCD1', SIN1', CTS1', and DSR1'; RI2', DCD2', SIN2', CTS2', and DSR2' and outputting two signals R0, R1 to the pulse position demodulation PPDM1. The pulse position demodulation PPDM1 then outputs a corresponding set of input signals RI1, DCD1, SIN1, CTS1, DSR1, RI2, DCD2, SIN2, CTS2, DSR2 to a corresponding UART1, UART2. The I/O coupler IC 30 comprises a control circuit 32 having two terminals for receiving the window signal and the clock signal from the control circuit and clock generator 12.

The present invention uses a pulse position modulation method to convert the parallel signals into serial signals and transmit the series signals to the receiver. The receiver then applies a pulse position demodulation method to convert the received signals into the recovery parallel signals.

The serial signals S0, R0, R1 are divided into six positions in a predetermined time interval and each position refers to a corresponding signal as shown in Table I below.

TABLE I

| Serial | Positions | | | | | |
|---|---|---|---|---|---|---|
| Signal | 1 | 2 | 3 | 4 | 5 | 6 |
| S0 | SOUT1 | RTS1 | DTR1 | SOUT2 | RTS2 | DTR2 |
| R0 | RI1 | DCD1 | SIN1 | CTS1 | DSR1 | |
| R1 | RI2 | DCD2 | SIN2 | CTS2 | DSR2 | |

Figure 3:
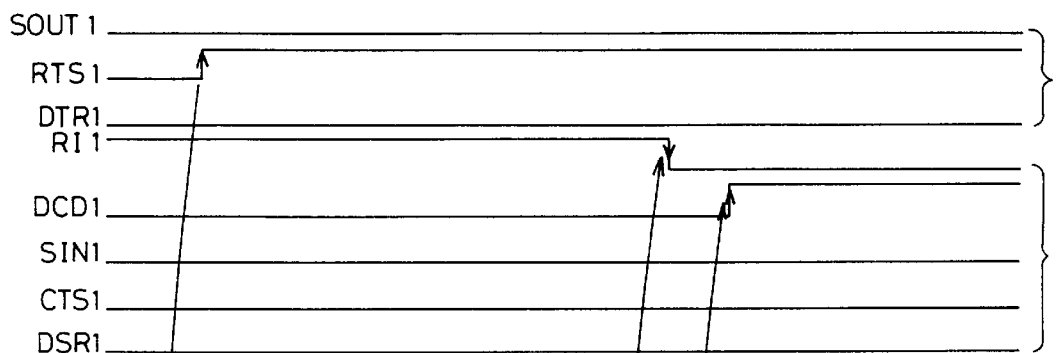
FIG. 3 is a timing diagram illustrating the waveforms found in the UART1 of the I/O integrated circuit in FIG. 2.
Figure 4:
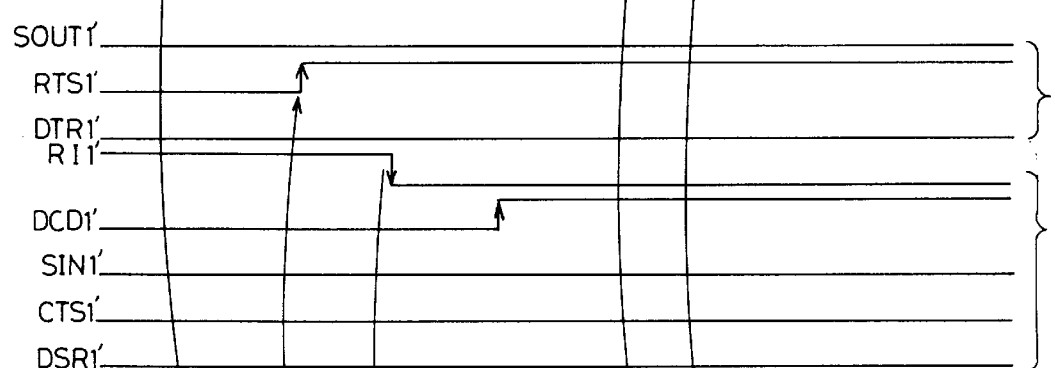
FIG. 4 is a timing diagram illustrating the waveforms found in the outputs of the I/O coupler circuit in FIG. 2.
Figure 5:
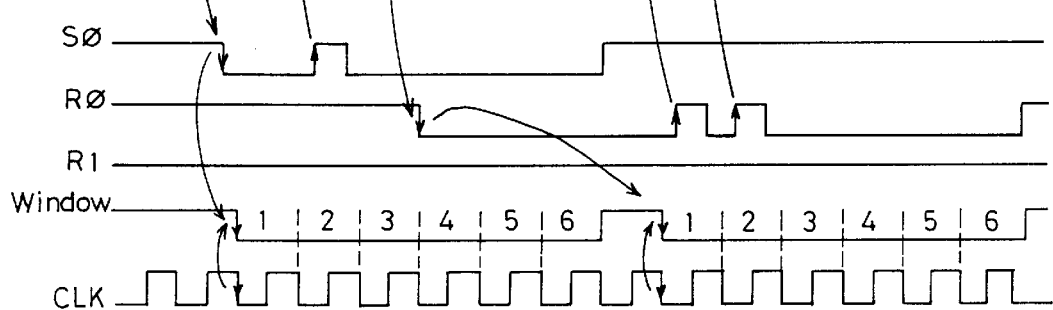
FIG. 5 is a timing diagram of signals transmitted between the I/O integrated circuit and the I/O coupler integrated circuit of FIG. 2.

If any of the parallel signals intends to change an existing value, it is necessary to generate a toggle pulse in a corresponding position. As shown in Table I and FIG. 3, the serial signal S0 is preset with six positions corresponding to signals SOUT1, RTS1, DTR1, SOUT2, RTS2, DTR2, respectively. If the signal RTS1 intends to change its existing value, a toggle pulse will be generated in the second position of the signal S0. Accordingly, the control circuit 32 of the I/O coupler IC 30 will easily know which signal intends to change its existing value by counting which position has a toggle pulse. Then, the signal S0 will be in a low level to activate the protocol for the PPM1 and PPDM1. Referring to FIG. 5, then the signal window in an active low logic will be pulled-down as a low level and retains for six positions of the time interval of low level, which is a unit width of the parallel transmission. As mentioned, a toggle pulse will be generated in second position of the signal S0. Then, the control circuit 32 of the I/O coupler IC 30 knows the second position has a toggle pulse, the value of the RTS1' will also be changed as shown in FIG. 4. The signal clock is used for synchronizing the I/O IC 10' and the I/O coupler IC 30, a frequency thereof preferably is 24 MHz or 48 MHz.

If the signals RI1' and DCD1' consequently change values as shown in FIG. 4, the existing unit width of signal window does not have enough interval to generate toggle pulses, the toggle pulses will be generated in a first and a second positions of next unit width of signal window. Accordingly, the signals RI1, DCD1 will change values respectively as shown in FIG. 3. As shown in FIG. 5, at least one clock cycle is retained between two unit widths of signal window for synchronization and distinguishing two sequential windows.

As mentioned, there is time delay during transmission, as Universal Asynchronous Receiver-transmitter (UART) which pertains to slow asynchronous transmission and the fastest rate related is 115.2 kbps, i.e., 10 $\mu$s in a period. If the frequency of the signal clock is 24 MHz, the longest delay time will be 6*40ns=0.24 $\mu$s, which is negligible in view of the 10 $\mu$s period. Alternatively, the frequency of the signal clock may be 48 MHz or even higher, and accordingly, a delay time thereof will also be shortened.

Although the invention has been explained in relation to its preferred embodiment, it is to be understood that many other possible modifications and variations can be made without departing from the spirit and scope of the invention as hereinafter claimed.

What is claimed is:

1. A circuit arrangement between an input/output (I/O) integrated circuit (IC) and an I/O coupler IC for communicating with an external apparatus, comprising:

a first universal asynchronous receiver-transmitter (UART) and a second UART provided within the I/O IC, each of the UART having a plurality of parallel output terminals and parallel input terminals;

a first pulse position modulation (PPM) circuit connected to the parallel output terminals of the first UART and the second UART and having an output pin for transmitting a sequential signal;

a first pulse position demodulation (PPDM) circuit connected to the parallel input terminals of the first UART and the second UART and having two input pins;

a second PPDM circuit provided within the I/O coupler IC and connected to the output pin of the first PPM circuit for receiving the sequential signal from the first PPM with two sets of output terminals;

a second PPM circuit provided within the I/O coupler IC and connected to the input pins of the first PPDM circuit with two sets of input terminals;

two voltage converters each respectively connected with a set of input terminals of the second PPM circuit and a set of output terminals of the second PPDM circuit and having a set of input parallel pins and a set of output parallel pins respectively connected to the external apparatus;

a control circuit/clock generator provided within the I/O IC and having two output pins; and a control circuit provided within the I/O coupler IC and having two input pins connected to the output pins of the control circuit/clock generator for synchronizing the signals between the I/O IC and the I/O coupler IC.

2. A circuit arrangement as claimed in claim 1, wherein said control circuit/clock generator provides a clock signal and a sequence signal.

3. A circuit arrangement as claimed in claim 2, wherein said sequence signal is composed of a plurality of unit time intervals each of which is divided into a plurality of time positions with an amount not less than an amount of the output serial terminals of the UARTs.

4. A circuit arrangement as claimed in claim 3, wherein every two of said unit time intervals is spaced with at least one time position.

5. A circuit arrangement as claimed in claim 3, wherein each of the time positions of the transmitted sequential signal of the first PPM corresponds to a corresponding signal on the output parallel terminals of the UARTs.

6. A circuit arrangement as claimed in claim 3, wherein each of the time position of the received sequential signals on the first PPDM corresponds to a corresponding signal on the input parallel terminals of the UARTs.

7. A circuit arrangement as claimed in claim 6, wherein said sequential signals will generate a toggle pulse at a corresponding time position to represent a value change in a corresponding parallel signal.

8. A circuit arrangement as claimed in claim 7, wherein said toggle pulse will be generated in a following unit time interval if the present unit time interval does not have enough interval to generate a toggle pulse.

* * * * *